United States Patent [19]

Robbins

[11] Patent Number: 4,569,873
[45] Date of Patent: Feb. 11, 1986

[54] COMPOSITE WOOD PANEL

[76] Inventor: Earl H. Robbins, 310 Garfield St., P.O. Box 668, Eugene, Oreg. 97401

[21] Appl. No.: 685,205

[22] Filed: Dec. 24, 1984

Related U.S. Application Data

[63] Continuation of Ser. No. 526,803, Oct. 21, 1983, abandoned, which is a continuation of Ser. No. 470,336, Feb. 28, 1983, abandoned, which is a continuation of Ser. No. 267,057, May 26, 1981, abandoned.

[51] Int. Cl.$^4$ .......................... B32B 5/12; B32B 31/00
[52] U.S. Cl. ..................................... 428/106; 428/529; 264/113; 156/62.2; 156/276
[58] Field of Search ................ 428/106, 529; 264/113; 156/62.2, 276, 283

[56] References Cited

U.S. PATENT DOCUMENTS

| | | | |
|---|---|---|---|
| 1,387,011 | 8/1921 | Ratcliff . | |
| 2,356,625 | 8/1944 | Schumann | 428/106 |
| 2,744,044 | 5/1956 | Toulmin, Jr. . | |
| 3,616,128 | 10/1971 | Pacourek | 428/106 |
| 3,715,257 | 2/1973 | Dunaway et al. . | |
| 4,086,382 | 4/1978 | Hites . | |
| 4,364,984 | 12/1982 | Wentworth | 428/106 |

Primary Examiner—John E. Kittle
Assistant Examiner—James J. Seidleck
Attorney, Agent, or Firm—Stevens, Davis, Miller & Mosher

[57] ABSTRACT

The dimensional stability of a composite wood panel having two surface wood veneer sheets with their grains disposed in the same direction and a core of adhesively bonded biomass particles such as processed wood particles is improved by including a third wood veneer sheet having its grain substantially perpendicular to the grains of the surface veneer sheets substantially centrally disposed in the core between the surface veneer sheets. The panel may be used as a wood structural panel in buildings, in furniture, or the like.

12 Claims, 3 Drawing Figures

COMPOSITE WOOD PANEL

This application is a continuation of application Ser. No. 526,803, filed Oct. 21, 1983, which is a continuation of U.S. Ser. No. 470,336 filed Feb. 28, 1983, which is a continuation of U.S. Ser. no. 267,057 filed May 26, 1981, all of which are now abandoned.

This invention relates generally to wood panels having improved dimensional stability and, more particularly, to composite laminated panels having wood veneer surfaces adapted to be used as structural panels or as components of furniture or similar articles made from wood.

It has been proposed before to manufacture plywood having a plurality of adhesively bonded wood veneer laminae for use in the construction of buildings. It has been proposed also to make composite wood panels having surface wood veneer sheets and a core of lignocellulose or the like particles adhesively bonded together to form a mat which is disposed as a core between the veneer sheets and adhesively bonded thereto. One of the problems inherent in prior art panels is that lateral expansion of the panel across the grain as the panel absorbs moisture which causes warping and buckling of the panel. Expansion of the panel in the direction of the grain is negligible.

A composition board panel having wood veneer or cardboard exterior surfaces cemented to fiber board or boxboard intermediate layers and a wire mesh reinforcement is disclosed, for example, in U.S. Pat. No. 1,387,011. A building plate composed of exterior veneer sheets and a core of bonded wood sawdust is disclosed in U.S. Pat. No. 2,356,625. The two exterior veneer sheets are disposed with the grains of the veneer sheets extending in the same direction. Longitudinally spaced veneer strips are adhesively bonded directly to the inside faces of the veneer sheets with the grain of the strips substantially perpendicular to the grain of the veneer sheets. While the veneer strips restrain lateral expansion somewhat and reduce accompanying warping and buckling of the panel as moisture is absorbed from the air, such plates have not been accepted to any great extent commercially because, inter alia, the product is not a completely balanced product. In one embodiment of the disclosed plate, the plate has in addition to the two surface veneer sheets a centralized third veneer sheet having its grain parallel to the grains of the surface sheets. The composite wood panel disclosed in U.S. Pat. No. 3,616,128 has a wood particle board core and face and back veneer plies adhesively bonded thereto. The grain of one of the surface veneers is perpendicular to the grain of the other facing veneer sheet to provide dimensional stability but the panel is not sufficiently dimensionally stable for many purposes.

It is an object of this invention to provide a panel having face and back veneer sheets and a mat of adhesively bonded biomass particles such as lignocellulose particles as a core which panel has improved dimensional stability and can be made on conventional apparatus at a commercially acceptable production rate. Another object of the invention is to provide a balanced laminated wood panel having wood veneer surface plies and a core of lignocellulose particles adhesively bonded into a mat and adhesively bonded face to face to the veneer plies. A still further object of the invention is to provide a process for making a dimensionally stable laminated wood panel having a core formed of adhesively bonded lignocellulose or similar biomass particles.

Other objects will become apparent from the following description with reference to the accompanying drawing wherein FIG. 1 is a perspective view of one embodiment of the wood panel provided by the invention with parts broken away for the purpose of illustrating various laminae of the composite panel;

Figure 1:
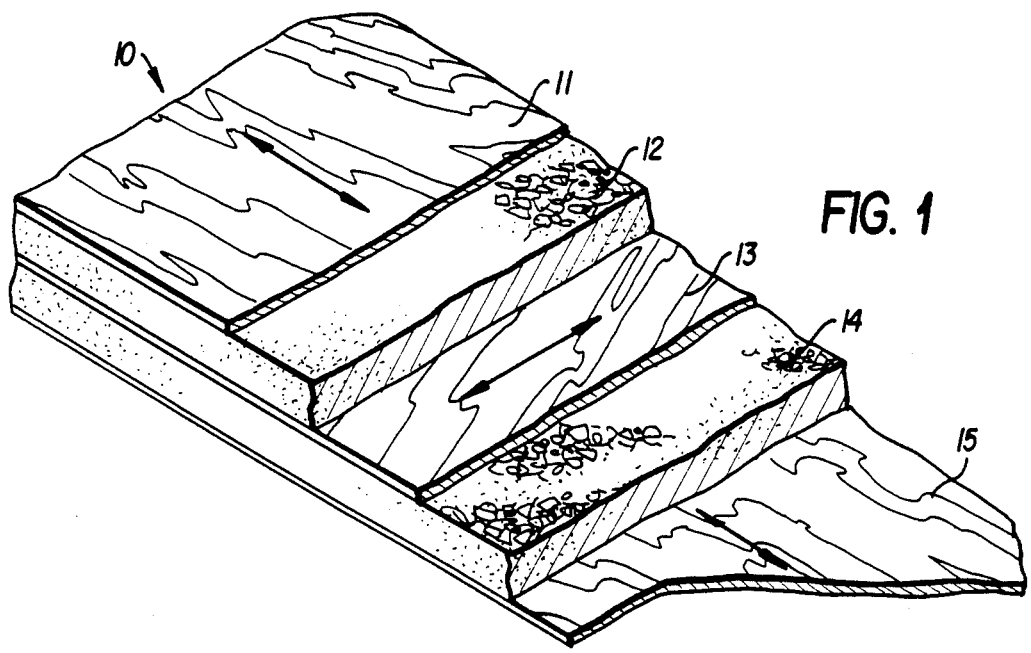

The foregoing objects and others are accomplished in accordance with this invention, generally speaking, by providing a composite wood panel having improved dimensional stability with variation of humidity in the ambient air about the panel and absorption of moisture by the panel, the panel comprising exposed wood veneer sheets and a core comprising a mat of lignocellulose or similar biomass particles adhesively bonded together and bonded to the face and back wood veneer sheets and an intermediate veneer sheet centrally disposed between the face and back veneer sheets which separates the core into two substantially equal thicknesses, the grain of the intermediate veneer sheet being disposed substantially perpendicularly to the grain in the two exposed veneer sheets. Such a panel can be fabricated on existing equipment used for making plywood and/or particle boards at a production rate which is acceptable in commercial production.

In one embodiment of the process provided by the invention, a first veneer sheet is placed on a caul plate, a layer of wood particles mixed with a suitable resinous adhesive is disposed on the veneer sheet on the caul plate, a second wood veneer sheet is disposed on the blend of sawdust particles and adhesive, a second layer of a blend of sawdust particles and adhesive is spread over the second veneer sheet and then a third veneer sheet is placed on the second layer of wood particles. The resulting composite is heated and pressed between plattens of a conventional press used in making particleboard, hardboard and the like to activate the adhesive, bond the particles together and bond the resulting particle layer or mat to the faces of the adjacent veneer sheets and thereby form a substantially rigid panel adapted to be used as a structural member in the construction of a building or the like.

In preferred embodiments of the process, the assembly is heated in the press to a temperature of about 300° F. to 350° F. or higher and is pressed under a pressure of from about 300 to about 450 lbs. per sq. inch or higher. During pressing the exposed veneer sheets are preferably compressed in thickness sufficiently to provide a substantially smooth surface thereby reducing the necessity of sanding or otherwise finishing the surface of the panel. From about 5% to about 10% by weight, dry basis, of a suitable adhesive such as an aqueous emulsion containing phenol formaldehyde resin, urea formaldehyde resin or malamine formaldehyde resin or a binder which chemically reacts with cellulose such as an organic polyisocyanate polymer is mixed with the biomass particles before the particles are laid on the veneer strip. Of the various organic polyisocyanates available commercially, polymers or diphenyl methane diisocyanate such as Mondur MR available from the Mobay Chemical Company, Pittsburg, Pa. or Pappi, available from UpJohn Chemical Co. may be used.

The panel can made from any suitable wood veneers such as Douglas fir or pine, or if the panel is to be used in making cabinets or other types of furniture, the surface veneers may be oak, mahogany, walnut or other suitable wood. A paper, ornamental wood or plastic sheet may be substituted for the surface veneer sheet or may be adhesively bonded to the exposed surfaces of the wood veneer sheets or the assembly of laminae can be pressed to form the panel under a pressure at which lignin in the wood veneer exudes to the surface and spreads thereover to form a substantially smooth surface. In one embodiment the intermediate veneer is bonded to the mat of particles with a polyisocyanate to avoid water in the adhesive.

It has been found that a panel in which the surface veneers have their grains parallel to each other and an intermediate centrally disposed veneer has its grain substantially perpendicular to the grains of the exposed veneer sheet is more dimensionally stable than a panel having exposed veneer sheets with grains extending in the same direction and having strips of veneer having the grain disposed at substantial right angles to the grain in the veneer sheet bonded directly to the inside surface of the veneer sheet. Also, the panel provided by the invention is more stable than a panel of only two veneer sheets with the grain of one sheet substantially perpendicular to the grain in the opposite veneer sheet. Moreover, the intermediate veneer sheet can be of a lower grade of wood such as white spec veneer or from a specie of low commercial value such as cottonwood. The thicknesses of the veneer used may be varied as to availability and depending upon the strength and structural requirements.

Figure 2:
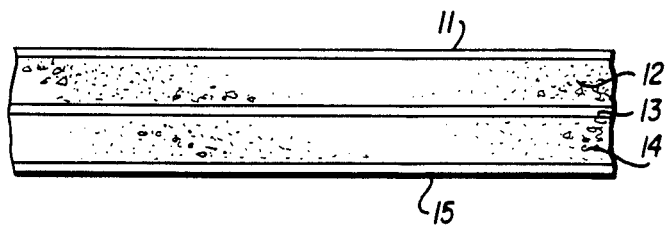
FIG. 2 is a partial end view of the embodiment illustrated in FIG. 1.

Referring now to FIGS. 1 and 2 of the drawing, the wood panel 10 provided by the invention has an exposed Douglas fir veneer sheet 11 adhesively bonded with phenol formaldehyde resin to a mat containing sawdust particles 12 bonded to each other with the same resin. The mat 12 is bonded on its opposite face to a Douglas fir veneer sheet 13. Veneer sheet 13 is bonded on its opposite face to a second mat for bonded sawdust particles 14 which in turn has its opposite face bonded to a second exposed Douglas fir veneer sheet 15.

Figure 3:
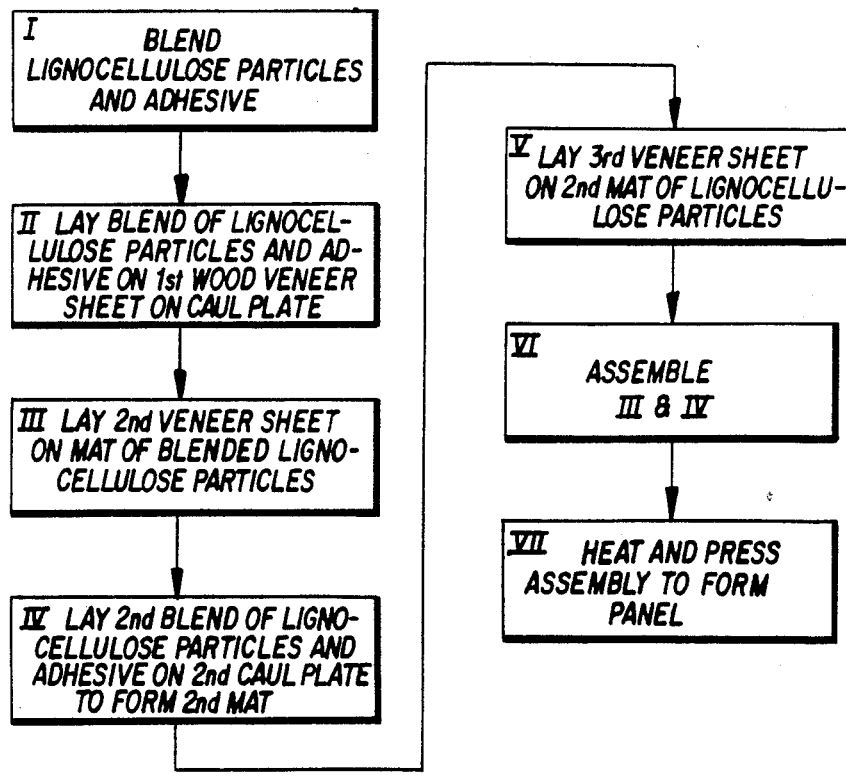
FIG. 3 is a flow sheet illustrating steps of an embodiment of the process provided by the invention.

The embodiment of the process illustrated by flow sheet in FIG. 3 of the drawing involves mixing about 6½% by weight (dry basis) of aqueous emulsion containing phenol formaldehyde resin with wood shavings having a particle size in one dimension which is less than the thickness of the mat to be produced. The resulting blend of adhesive and sawdust particles is spread over the surface of a veneer sheet such as 15 illustrated in FIG. 2 to form a mat 14. A second veneer sheet 13 is laid on the mat 14 and a second layer of blended phenol formaldehyde adhesive and sawdust particles is laid on veneer sheet 13. A third veneer sheet 11 is then placed face to face with mat 12 and the assembly is placed between two heated plattens where it is heated to a temperature of about 300° F. to 350° F. or higher and pressed at a pressure of about 300 to 450 psi. The phenol formaldehyde melts and then thermosets or cures bonding the wood particles and wood veneer sheets together to form a rigid composite of wood veneer and wood particles. The resulting panel can be used for siding, subflooring or as a foundation for a roof of a building or for other structural or industrial purposes. Preferably the panel has a thickness of from about ½" to about 1⅛".

While any thermosetting resin such as urea formaldehyde or melamine formaldehyde can be substituted for the phenol formaldehyde in making the panel, urea formaldehdye is seldom used in panelling to be used in structures where the paneling will be exposed to the weather.

The thickness of the veneer sheet 13 required to impart dimensional stability to the panel may vary with the thickness of the panel and the thicknesses of the veneer sheets 11 and 15. So far, it has been found advantageous to provide a veneer sheet for the intermediate veneer sheet 13 which is about 1/10 inch or more thick for panels which are about ½ inch thick and have wood veneers 11 and 15 about 0.1 inch thick each. In panels which are about ⅝ inch thick having similar surface and intermediate veneer thicknesses, the thickness of the intermediate veneer is preferably at least about 1/10 inch. In a panel about ¾ inch thick, the thickness of the intermediate veneer sheet can be increased to ⅛ inch to about 1/6 inch or more. In general, the thickness of the intermediate veneer sheet 13 need not be any thicker than the thickness of one of the veneer sheets and can be less sometimes than the thickness of either sheet 11 or 15 to restrain expansion of the panel in a direction across the grains of the veneer sheets 11 and 15 upon absorption of moisture with accompanying warping and buckling of the panel.

While lignoccellulose particles including wood sawdust have been used principally in the foregoing description for the sake of simplification, it is to be understood that any suitable biomass particles including wood shavings, wood flakes, bagasse, peat, and ground wood particles may be used to make the mats of the core of the panel but wood particles are preferred. The flakes and other elongate particles bonded together to form the mats of the core may be oriented by conventional electronic means such as in the direction of the grain of the intermediate veneer sheet to further restrain undesirable expansion across the grain of the surface veneer sheets. Strengthening fibers such as fiber glass may be mixed with the biomass particles for additional strength.

The thickness of the particle mats of the core is to be sufficient to fill the space between a surface veneer and the intermediate veneer sheet and may vary from about ⅛ inch to about ½ inch after pressing depending upon the thickness of the panel and will usually be at least about twice the thickness of the exposed veneer sheets.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. A dimensionally stable panel comprising spaced facing exposed veneer sheets disposed with the grain in one exposed veneer sheet substantially parallel with the grain in the other exposed veneer sheet, an intermediate veneer sheet coextensive with the exposed veneer sheets and disposed substantially centralized between the exposed veneer sheets with the grain of said intermediate veneer sheet substantially perpendicular to the grains of the exposed veneer sheets, and a mat comprising adhesively bonded biomass particles disposed between each exposed veneer sheet and the intermediate veneer sheet and bonded to each of the adjacent veneer sheets, each said mat having a thickness greater than that of said exposed veneer sheets, said intermediate veneer sheet restraining linear expansion of the panel across the grains of the exposed veneer sheets.

2. The panel of claim 1 wherein each of the veneer sheets exposed on the surface of the panel is about 1/20 to about ⅛ inch thick and the intermediate veneer sheet is about 1/10 to about 3/16 inch thick.

3. The panel of claim 1 wherein said bonded biomass particles are lignocellulose particles.

4. The panel of claim 1 wherein said particles are bonded together with a polymeric organic polyisocyanate and to the intermediate veneer sheet.

5. The panel of claim 1 wherein the said mats are bonded to the exposed veneer sheets with a phenol formaldehyde resin.

6. The panel of claim 1 wherein said bonded biomass particles are bagasse.

7. A process for making a structural composite wood panel which comprises assembling face to face first and second wood veneer sheets having the grains thereof disposed in substantially the same direction and a third veneer sheet substantially centrally disposed coextensively between the said first and second veneer sheets with its grain substantially perpendicular to the grains of the first and second veneer sheets and, between the third veneer sheet and each of the first and second veneer sheets, a mass of biomass particles blended with particles of a thermosetting resinous or chemically reactive adhesive, and heating and pressing the resulting assembly to cure the adhesive to bond the particles together and to bond the resulting mats thereof to adjacent faces of the three veneer sheets.

8. The process of claim 7 wherein the assembly is heated and pressed between plattens at a temperature of about 300° F. to 350° F. or higher at a pressure of at least about 300 to about 450 psi or higher.

9. The process of claim 8 wherein the adhesive is phenol formaldehyde.

10. The process of claim 8 wherein the adhesive is an organic polyisocyanate.

11. The product of claim 1 wherein a strengthening synthetic resin fiber is mixed with said biomass particles.

12. The product of claim 11 wherein the said fibers are fiberglass.

* * * * *